US007301285B2

(12) United States Patent
Kunieda

(10) Patent No.: US 7,301,285 B2
(45) Date of Patent: Nov. 27, 2007

(54) CONTROL METHOD FOR DISCHARGE LAMP

(75) Inventor: Yukio Kunieda, Nagoya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/492,562

(22) Filed: Jul. 25, 2006

(65) Prior Publication Data

US 2007/0029948 A1 Feb. 8, 2007

(30) Foreign Application Priority Data

Aug. 2, 2005 (JP) ............................ 2005-224273

(51) Int. Cl.
*B60Q 1/02* (2006.01)

(52) U.S. Cl. ........................................ 315/82; 307/10.8

(58) Field of Classification Search .................. 315/46, 315/77, 80, 82, 160, 291; 307/10.1, 10.6, 307/10.8

See application file for complete search history.

(56) References Cited

U.S. PATENT DOCUMENTS 6,320,275 B1 * 11/2001 Okamoto et al. .......... 307/10.1
6,850,015 B2 2/2005 Ishizuka et al. ............ 315/224

* cited by examiner

*Primary Examiner*—Thuy Vinh Tran
(74) *Attorney, Agent, or Firm*—Harness, Dickey & Pierce, PLC

(57) ABSTRACT

A method for controlling a discharge lamp by a power controlling device on an automobile vehicle includes a starting step and a switching step. The device supplies electricity to the lamp. In the starting step, the discharge lamp starts to emit a light such that the device supplies a first electricity. In the switching step, the device switches from the first electricity to a second electricity so that the lamp maintains to emit the light with the second electricity, which is smaller than the first electricity. In the switching step, a temperature of the lamp is decreased with a temperature gradient, which is equal to or smaller than a predetermined gradient.

8 Claims, 2 Drawing Sheets

CONTROL METHOD FOR DISCHARGE LAMP

CROSS REFERENCE TO RELATED APPLICATION

This application is based on Japanese Patent Application No.2005-224273 filed on Aug. 2, 2005, the disclosure of which is incorporated herein by reference.

FIELD OF THE INVENTION

The present invention relates to a control method for a discharge lamp.

BACKGROUND OF THE INVENTION

In these years, a light called discharge light is used for a head light on an automotive vehicle. A lamp, i.e., a discharge lamp, which emits light by discharging electricity, provides the discharge light. Characteristics (e.g., electricity consumption, brightness, and lifetime) of the discharge lamp on the vehicle are improved dramatically compared with a conventional lamp using a filament. The conventional discharge lamp on the vehicle is disclosed in U.S. Pat. No. 6,850,015, for example.

The conventional discharge lamp on the vehicle includes a discharge lamp, which emits light, and a power controller for supplying and controlling a power for the discharge lamp. The conventional discharge lamp is supplied with different electric powers between at a start-up of lighting and at a stationary state coming after the start-up. That is, at the start-up, a large power is needed for the discharge lamp, in order to generate the discharge between electrodes in the discharge lamp and provide light having required intensity immediately after the start of lighting. Actually, the large power (i.e., starting electricity) is provided for the discharge lamp. Next, after the discharge generation in the discharge lamp, maintaining a stable discharging state is needed so that a stable power (i.e., stationary electricity) is supplied to the discharge lamp. For example, the discharge lamp functions with a condition that the starting electricity is 75 W and the stationary electricity is 35 W. The stationary electricity is lower than the starting electricity. The power controller controls the power supplied to the discharge lamp. A shift from the starting electricity to the stationary electricity is performed in such a manner that the shift is provided by a linear curve having a large gradient. The large gradient represents that an electricity variation per unit time becomes large.

After a state, in which the discharge lamp is not lighting, is kept for a long time, when the discharge lamp starts lighting (i.e., a cold start is performed), discharging electrodes are not warmed adequately. Under this condition, when the electricity is lowered rapidly from the starting electricity to the stationary electricity, a temperature irregularity is generated on the electrodes. The temperature irregularity on the electrodes causes a partial change of the discharging place on the electrodes. The partial change of the discharging place on the electrodes causes a change of an arc, which is generated between electrodes of the discharge lamp. The change of the arc causes a fluctuation of the arc. Thus, the light of the discharge lamp is not stable.

Moreover, in the conventional discharge lamp on the vehicle, a radio noise is generated by the discharge in the discharge lamp and the rapid electricity change.

SUMMARY OF THE INVENTION

In view of the foregoing and other problems, it is an object of the present disclosure to provide a method for controlling a discharge lamp, wherein the discharge lamp emits a stable light and a generation of a radio noise from the discharge lamp is prevented.

According to an aspect of the disclosure, a method for controlling a discharge lamp by a power controlling device on an automobile vehicle, wherein the device supplies an electricity to the lamp, includes a starting step and a switching step. In the starting step, the discharge lamp starts to emit a light such that the device supplies a first electricity. In the switching step, the device switches from the first electricity to a second electricity so that the lamp maintains to emit the light with the second electricity, which is smaller than the first electricity. In the switching step, a temperature of the lamp is decreased with a temperature gradient, which is equal to or smaller than a predetermined gradient.

The temperature of the lamp is decreased slowly so that a temperature irregularity of an electrode of the discharge lamp is not generated. A partial change of the discharging place on the electrode is not generated. Thus, an arc generated between the electrodes of the discharge lamp is stable. Accordingly, the light of the discharge lamp is stable.

The above-described operation is especially effective for a cold start. The cold start represents that the discharge lamp starts lighting after a state, in which the discharge lamp is not lighting, is kept for a long time. Under this condition, discharging electrodes are not warmed adequately. When the electricity is lowered rapidly from the first electricity to the second electricity, a temperature irregularity is generated on the electrode.

Further, a generation of a radio noise can be decreased. The displacement of the arc position generates a radio noise. The electricity decrease rate is set to be small in the temperature range, in which the radio noise generates. Thus, the generation of the radio noise is reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
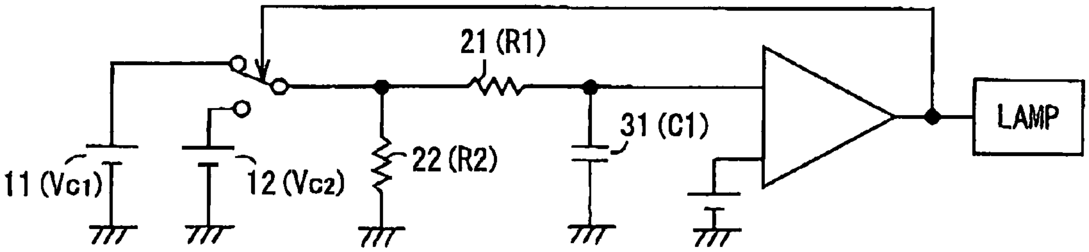
FIG. 1 is a circuit diagram showing a power controller for a discharge lamp according to an embodiment.

A discharge lamp on an automotive vehicle according to an embodiment of the present invention is supplied with electricity from a power controller shown in FIG. 1, so that the discharge lamp emits light.

The power controller of the discharge lamp includes a first power source 11, a second power source 12, a timer capacitor 31 energized by the first and second power sources 11, 12, a resistor 21 disposed between the power sources 11, 12 and the timer capacitor 31, and a switch for switching between the power sources 11, 12 in accordance with an input from the timer capacitor 31. Moreover, the power controller of the discharge lamp includes another resistor 22 for discharging the electricity stored in the timer capacitor 31. The first power source 11 has a charging voltage $V_{C1}$, and the second power source 12 has a charging voltage $V_{C2}$. The resistor 21 has a resistance R1, and the resistor 22 has a resistance R2. The timer capacitor 31 has a capacitance C1. Conventional products can be used for the discharge lamp, the power sources 11, 12, the timer capacitor 31, and the resistors 21, 22. The output electricity from the power sources 11, 12 can be controlled.

The discharge lamp discharges electricity by applying high voltage between electrodes of the discharge lamp. Then, after the discharge, electricity selected from one of the power sources 11, 12 is supplied. Thus, the discharge lamp emits light. After the discharge lamp is supplied with large electricity at the start-up of the lighting, the discharge lamp is supplied with smaller electricity than at the start-up of the lighting.

Figure 2A:
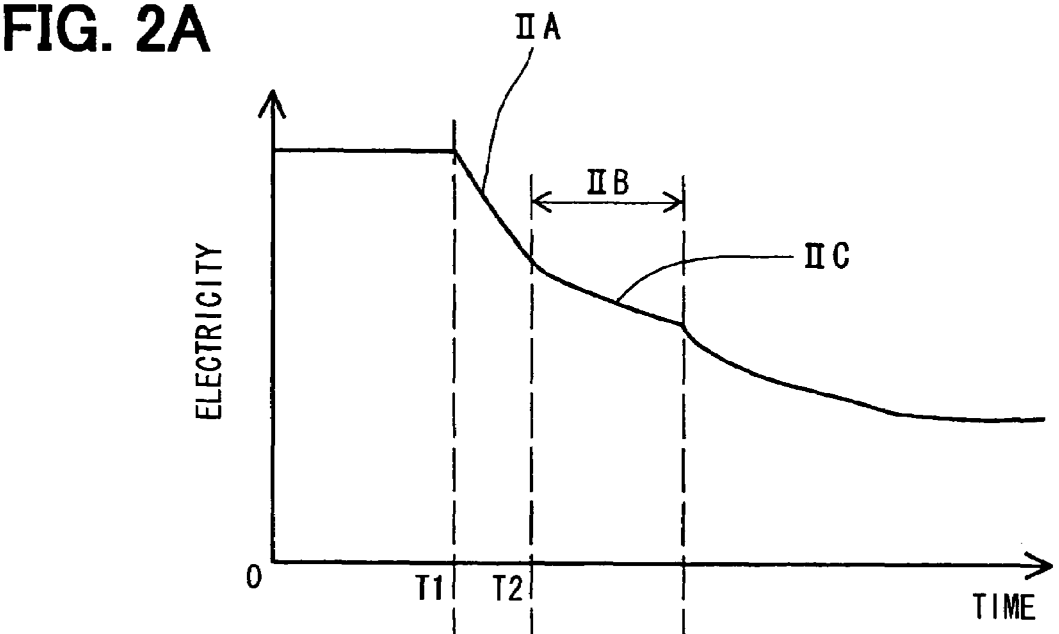
FIG. 2A is a graph showing a relationship between electricity of the lamp and time.
Figure 2B:
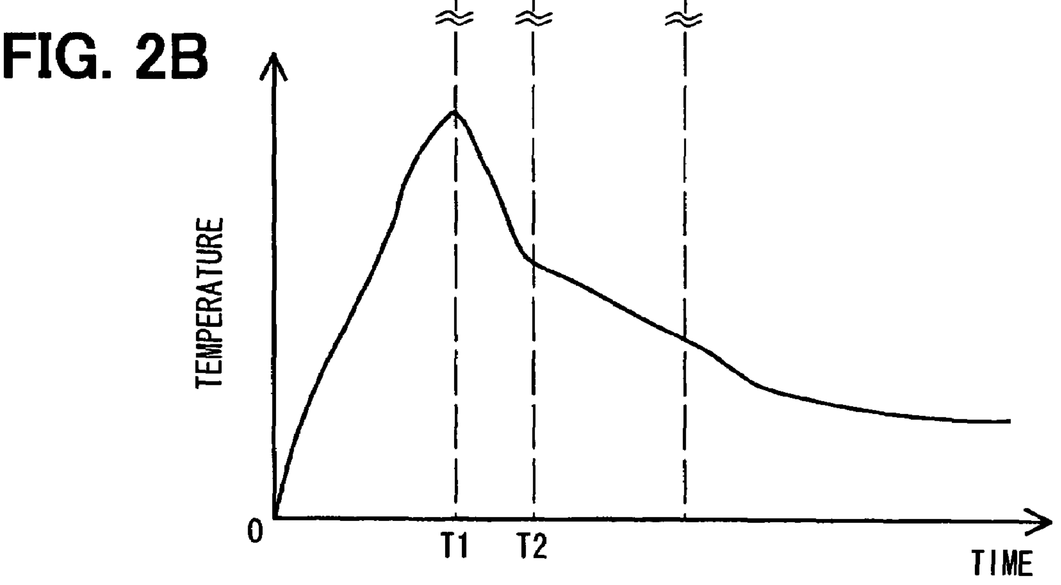
FIG. 2B is a graph showing a relationship between temperature of an electrode in the lamp and time.

An operation of the discharge lamp according to the embodiment will be described below, in which the discharge lamp starts lighting in a cold start (after the state, the discharge lamp is not lighting, is kept for a long time). FIG. 2A is a graph showing electricity change supplied to the discharge lamp and FIG. 2B is a figure showing a temperature change of electrodes of the discharge lamp.

The discharge lamp lights up or lights out by an instruction from a switch for lighting (not shown) provided in a vehicle. Specifically, when a driver of the vehicle turns on or off the switch, the lamp is turned on or off in accordance with a control signal, i.e., the instruction of the switch. When the discharge lamp starts lighting, the switch selects the first power source 11. Accordingly, electricity corresponding to the voltage charged in the timer capacitor 31 is supplied to the discharge lamp from the first power source 11. Thus, the discharge of the electricity between the electrodes raises the electrode temperature of each electrode in the discharge lamp.

When a predetermined time (T1 in FIG. 2A) from the start of the lighting passes, the electricity supplied to the discharge lamp from the first power source 11 decreases. The electricity decrease depends on a relationship between the resistance of the resistor 21 and the capacitance of the capacitor 31. That is, the electricity supplied to the discharge lamp decreases, in response to the voltage value charged on the timer capacitor 31. The electricity decreases from the starting electricity (e.g., 75 W) with a first decrease rate (shown as IIA in FIG. 2A), which has a nearly linear gradient.

The electrode temperature of the discharge lamp also decreases, when the electricity decrease from the first power source 11. When the electrode temperature of the discharge lamp reaches a predetermined temperature, the electricity starts decreasing with a second decrease rate (shown as IIC in FIG. 2A), which is smaller than the first decrease rate. The electricity decrease with the second decrease rate continues until the electricity supplied to the discharge lamp decreases to 35 W. Thereafter, the discharge lamp emits the light by consuming 35 W electricity. In addition, the determination to change the decrease rate of the electricity from the first rate to the second rate is performed based on the time passing from the start of the discharging of the discharge lamp. If a temperature detector for measuring the electrode temperature of the discharge lamp is mounted on the vehicle, the detector interrupts the light generated by the discharge lamp. Accordingly, the electrode temperature is preliminarily measured, calculated or determined so that the electrode temperature is estimated from the electricity supplied to the discharge lamp. On the basis of the change of the electrode temperature, the time (T2 in FIG. 2A) for changing the decrease rate is determined.

The predetermined temperature for changing the electricity decrease rate is the temperature in which the discharge lamp starts generating a radio noise (IIB in FIG. 2A) when the electricity is decreased with the first decrease rate. To be specific, if the electricity supplied to the discharge lamp continues to decrease with the first decrease rate, a rapid change of the electricity is generated. The electricity change causes a temperature change of the electrode. In this case, the electricity change causes the temperature decrease. The temperature change of the electrode causes a partial temperature difference between a part in which the electricity is discharged and a part in which the electricity is not discharged. According to the partial temperature difference, an arc position of the discharging is displaced. The displacement of the arc position generates a radio noise. However, in this embodiment, the electricity decrease rate is set to be small in the temperature range, in which the radio noise generates. Thus, the generation of the radio noise is reduced.

Moreover, when the electricity decrease rate is changed, a power controller changes the power source from the first power source 11 to the second power source 12. The change of the power source is controlled by an instruction signal from the timer capacitor 31. The timer capacitor 31 determines the time for changing the power source by the capacitance of the timer capacitor 31 and the voltage applied to the timer capacitor 31. To be specific, when the electricity is supplied to the discharge lamp, the electricity is also supplied to the timer capacitor 31. The timer capacitor 31 is not charged with the electricity when the discharge lamp does not emit the light. When the electricity starts to be supplied to the discharge lamp, the timer capacitor 31 starts to be charged with the electricity. The timer capacitor 31 is charged with the electricity up to a predetermined quantity corresponding to the electricity of the first power source 11. After the timer capacitor 31 is charged with the electricity up to the predetermined quantity, the electricity supplied to the discharge lamp is changed from the first power source 11 to the second power source 12.

In the discharge lamp, the electricity supplied to the discharge lamp is lowered not only by controlling the first power source 11 but also by switching from the first power source 11 to the second power source 12. The second power source 12 has almost the same characteristic as the first power source 11, but the second power source 12 supplies a small voltage. The timer capacitor 31 can be charged with the electricity by using the small voltage. This will be described below.

A capacitor voltage V is known for being calculated by the following formula F1.

$$V=V_{C1}(1-e^{-T/R1C1}) \quad \text{(F1)}$$

Figure 3:
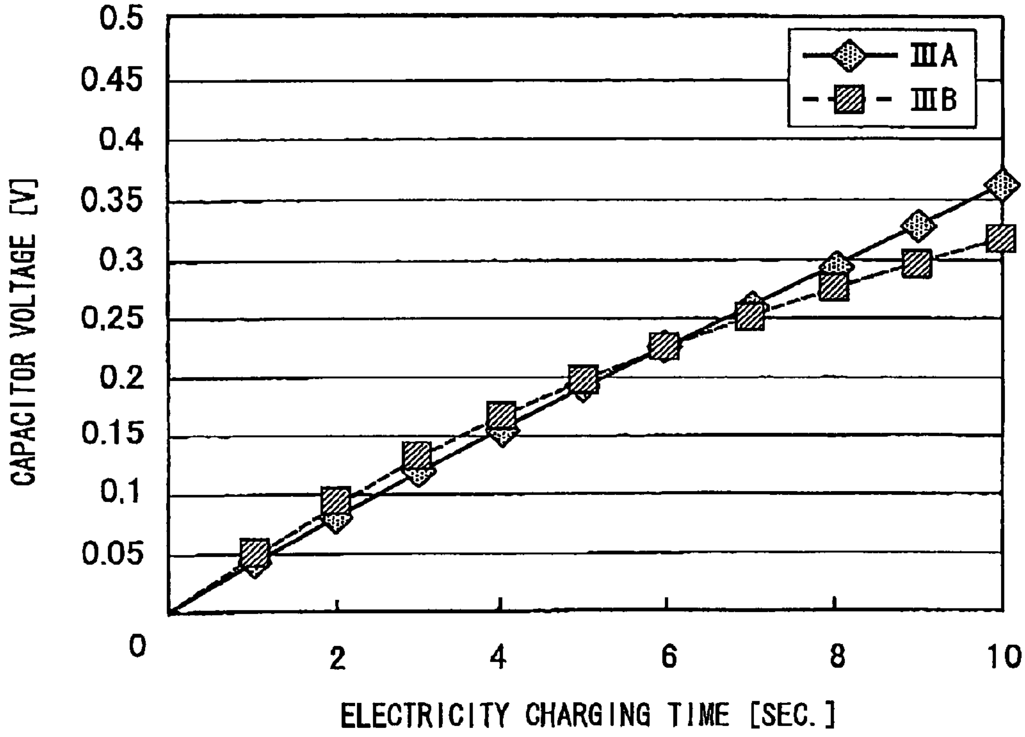
FIG. 3 is a graph showing a relationship between a capacitor voltage and a charging time.

Here, $V_{C1}$ represents a charging voltage, so that the capacitor voltage V can be changed not only by a resistance R1 and/or a capacitance but also by the charging voltage $V_{C1}$. That is, lowering the charging voltage V enables the capacitor to be charged gradually. A circuit is formed with a power source 11 or 12, a resistor 21 and a timer capacitor 31, which are arranged as shown in FIG. 1. The capacitance C1 of the capacitor 31 is constant, e.g., 10 μF. The charging voltage $V_{C1}$ or $V_{C2}$ and the resistance R1 are changed. The relationship between a charging time T and the capacitor voltage V is measured and shown in FIG. 3. In FIG. 3, a curve IIIA represents a condition No.1 in which the charging voltage V is 2V and the resistance R1 is 5MΩ, and a curve IIIB represents a condition No.2 in which the charging voltage V is 0.5V and the resistance R1 is 1MΩ.

As shown in FIG. 3, the curves IIIA and IIIB have closely the same characteristics. That is, even if the resistance R1 of the resistor 21 connected to the capacitor 31 is small, lowering the charging voltage V enables the capacitor 31 to gain the same voltage as in a case where the resistance R1 is large. Moreover, in the prior art, there is a problem that the discharge is delayed when the resistance R1 is large. However, in the present embodiment, the problem that the discharge is delayed is eliminated because the small resistance R1 can be used. Further, because the capacitor 31 having the large capacitance C1 is expensive, using the capacitor 31 having smaller capacitance C1 is preferable for decreasing the cost of the lamp manufacturing.

Furthermore, when the electricity supplied to the discharge lamp decreases with the second decrease rate when the discharge lamp is lighting, the second decrease rate can be changed to a third decrease rate. Here, when the electricity decreases with the third decrease rate, a radio noise is not generated. The third decrease rate may be smaller or larger than the second decrease rate. In case that the third decrease rate is larger than the second decrease rate, the electricity supplied to the discharge lamp decreases quickly to the required level (35 W). On the other hand, in case that the third decrease rate is smaller than the second decrease rate, the generation of the temperature irregularity on the electrode can be decreased and more stable arc discharge is generated.

The present disclosure has the following aspects.

According to a first aspect of the present disclosure, a method for controlling a discharge lamp by a power controlling device on an automobile vehicle, wherein the device supplies an electricity to the lamp, includes steps of: starting to emit a light from the lamp in such a manner that the device supplies a first electricity to the lamp; and switching the device from the first electricity to a second electricity so that the lamp maintains to emit the light with the second electricity. The second electricity is smaller than the first electricity. In the step of the switching, a temperature of the lamp is decreased with a temperature gradient, which is equal to or smaller than a predetermined gradient.

Alternatively, the step of switching may include a first decreasing step and a second decreasing step. The first decreasing step has a first decrease rate. The second decreasing step has a second decrease rate, which is smaller than the first decrease rate.

Alternatively, the first decreasing step with the first decrease rate may be performed from a beginning of the step of switching to a time when the temperature of the lamp reaches a predetermined temperature. The second decreasing step with the second decrease rate may be performed after the time when the temperature of the lamp reaches the predetermined temperature.

Alternatively, the predetermined temperature of the lamp may be a temperature, at which the discharge lamp starts generating a radio noise with a change of the electricity supplied to the discharge lamp.

Alternatively, the power controlling device may include a first power source, a second power source, an electricity supplying portion, and a power source switching portion. The first power source supplies electricity with the first decrease rate. The second power source supplies electricity with the second decrease rate. The electricity supplying portion energizes the discharge lamp with the electricity from the first power source or the second power source. The power source switching portion switches between the first power source and the second power source.

Alternatively, the power source switching portion may include a timer capacitor for switching between the first power source and the second power source in accordance with an input from the first power source.

While the invention has been described with reference to a preferred embodiment thereof, it is to be understood that the invention is not limited to the preferred embodiment and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for controlling a discharge lamp by a power controlling device on an automobile vehicle, wherein the device supplies an electricity to the lamp, the method comprising steps of:

starting to emit a light from the lamp in such a manner that the device supplies a first electricity to the lamp; and switching the device from the first electricity to a second electricity so that the lamp maintains to emit the light with the second electricity, wherein the second electricity is smaller than the first electricity, and in the step of the switching, a temperature of the lamp is decreased with a temperature gradient as being affected by the change of the supplied electricity, the temperature gradient being equal to or smaller than a predetermined gradient.

2. The method according to claim 1, wherein the step of switching includes a first decreasing step and a second decreasing step, the first decreasing step has a first decrease rate, and the second decreasing step has a second decrease rate, which is smaller than the first decrease rate.

3. The method according to claim 2, wherein the first decreasing step with the first decrease rate is performed from a beginning of the step of switching to a time when the temperature of the lamp reaches a predetermined temperature, and the second decreasing step with the second decrease rate is performed after the time when the temperature of the lamp reaches the predetermined temperature.

4. The method according to claim 3, wherein the predetermined temperature of the lamp is a temperature, at which the discharge lamp starts generating a radio noise in accordance with a change of the electricity supplied to the discharge lamp.

5. The method according to claim 3, wherein the power controlling device includes a first power source, a second power source, an electricity supplying portion, and a power source switching portion, the first power source supplies electricity with the first decrease rate, the second power source supplies electricity with the second decrease rate, the electricity supplying portion energizes the discharge lamp with the electricity supplied from the first power source or the second power source, and the power source switching portion switches between the first power source and the second power source.

6. The method according to claim 5, wherein the power source switching portion includes a timer capacitor for switching between the first power source and the second power source in accordance with an input from the first power source.

7. The method according to claim 1, wherein the predetermined gradient provides stability of an arc generated in the lamp.

8. The method according to claim 1, wherein the lamp includes an electrode having an electrode temperature, and the predetermined gradient provides homogeneity of the electrode temperature.

* * * * *